July 2, 1946.  C. L. PETERSON ET AL  2,403,021
METHOD AND APPARATUS FOR FILTRATION
Filed April 28, 1942   3 Sheets-Sheet 1

Inventors:
Clarence Lynn Peterson
Clarence J. Peterson

Pierce + Scheffer Attorneys.

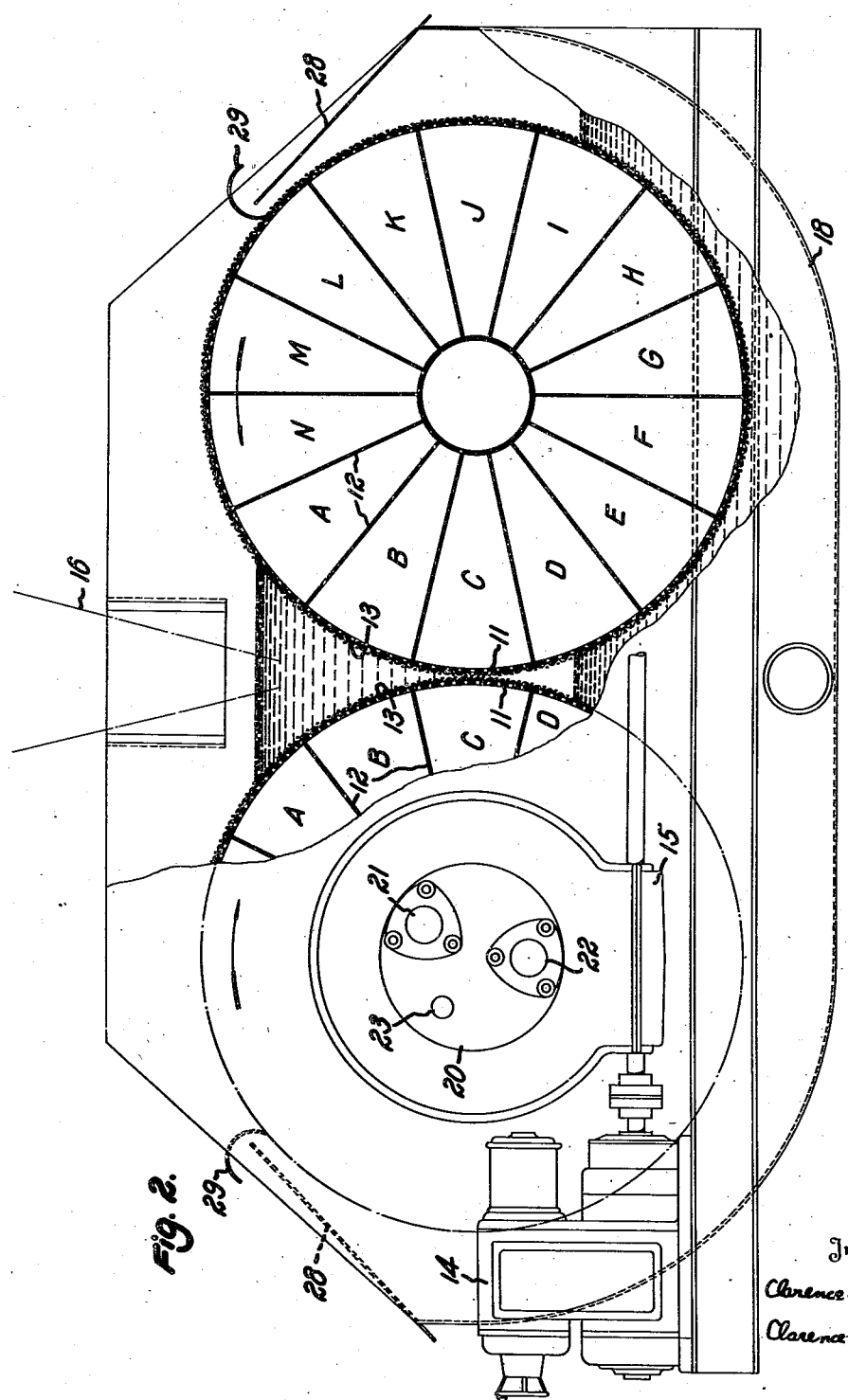

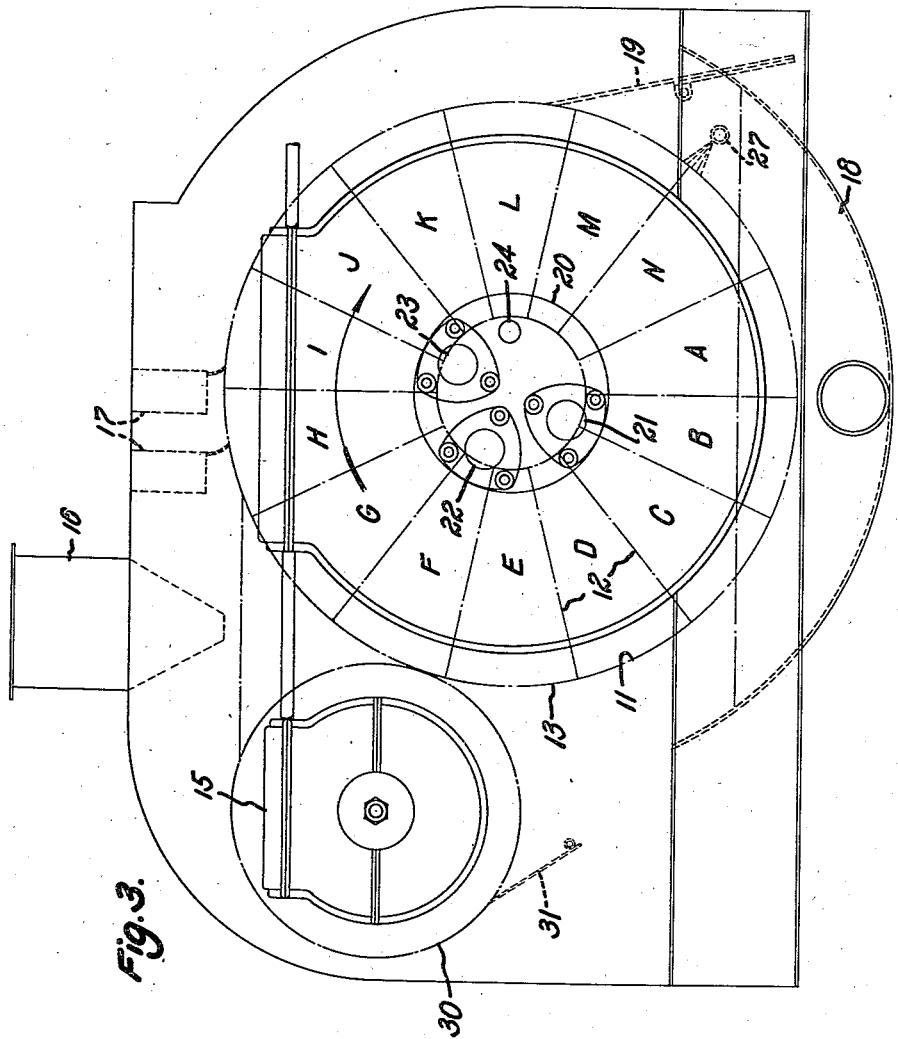

Patented July 2, 1946

2,403,021

UNITED STATES PATENT OFFICE 2,403,021

METHOD AND APPARATUS FOR FILTRATION

Clarence Lynn Peterson and Clarence J. Peterson, Salt Lake City, Utah

Application April 28, 1942, Serial No. 440,858

18 Claims. (Cl. 210—201)

This invention relates to method and apparatus for the filtration of liquids, and particularly to continuous rotary filters and their operation.

In the removal of solids from many liquid-solid mixtures, it has been found that the rate and effectiveness of the filtration may be substantially increased by applying to the filter surface before the filtering operation a layer of filter aid such as diatomaceous earth, fuller's earth, filter char and the like. However, the use of such precoated layers of filtration aiding material in connection with continuous filtration apparatus has been far from satisfactory. When a precoat of filter aid is applied to the filter surface of a rotary drum filter and the fluid mixture to be filtered is then fed to the apparatus, if a layer of filter aid of optimum thickness and suitable properties has been applied, the filtration operation begins with a high rate of flow and a satisfactory clarity of filtrate. However, as the operation continues the rate of flow progressively decreases due to a progressive building up of slimes on and in the surface of the precoated layer of filter aid and after a short time, varying with the character of the material being filtered, the layer of precoated filter aid must be removed and replaced with a layer of fresh material, thus interrupting the continuity of the operation. Moreover, even during the periods of filtration the conditions are continually changing due to the progressive alteration of the precoated layer and the resulting operation is disctontinuuos and non-uniform whereas the goal of filtration technicians is to obtain continuous uniform operation. This method of operation is also subject to the disadvantage that removal of the filter cake must be very carefully controlled to avoid cutting into the precoated layer and thus causing a loss of clarity in the filtrate.

It has been proposed to precoat the filter surface of rotary drum filters with a relatively thick layer of filter aid and to remove a thin surface portion of this layer together with the filter cake at each revolution of the drum. It will be seen, however, that this method of operation results in a progressive change in filtration characteristics since the filter aid layer is constantly changing in thickness and it is at optimum thickness only during a small portion of the operating cycle. This method, moreover, does not provide for continuous operation although with some materials it may substantially increase the period of operation between shut-downs for precoating.

A principal purpose of the present invention is the provision of a method of operation and apparatus whereby truly uniform and continuous filtration of liquids through a precoated layer of filtration aiding material may be attained.

A further purpose of the invention is the provision of a rotary drum filter apparatus whereby a continually renewed layer of filter aid of controlled uniform thickness may be applied to the filter surface.

The method and apparatus of the invention by which these and other purposes and advantages are attained comprise establishing a layer of filter aid material on the circumferential surface of a rotating drum filter at a predetermined zone, continuously supplying to the precoated filter surface material to be filtered while maintaining a differential pressure across said filter surface in the zone of supply, and continuously removing the layer of filter aid material and deposited filter cake before the filter surface has arrived at the precoating zone, and means adapted for practicing said method comprising a rotatable filter drum including means for supporting a filtering medium about the circumferential surface thereof, means cooperating with the circumferential and end surfaces of the drum to provide a feed chamber above the axis of rotation of the drum, and means providing a second feed chamber adjacent the circumferential surface of the drum below the axis of rotation thereof. The apparatus of the invention advantageously includes means for applying a controlled differential pressure across the filter surface varying in amount and direction at various points about the circumference of the drum in accordance with the demands of the successive elements of the filtration operation.

Other features and advantages of the invention will be apparent from the following detailed description of illustrative embodiments of the invention with particular reference to the acompanying drawings in which:

Fig. 2 is a side elevation in partial section of a filter apparatus embodying a modified form of the invention; and Fig. 3 is a side elevation in partial section of a further embodiment of the invention.

Figure 1:
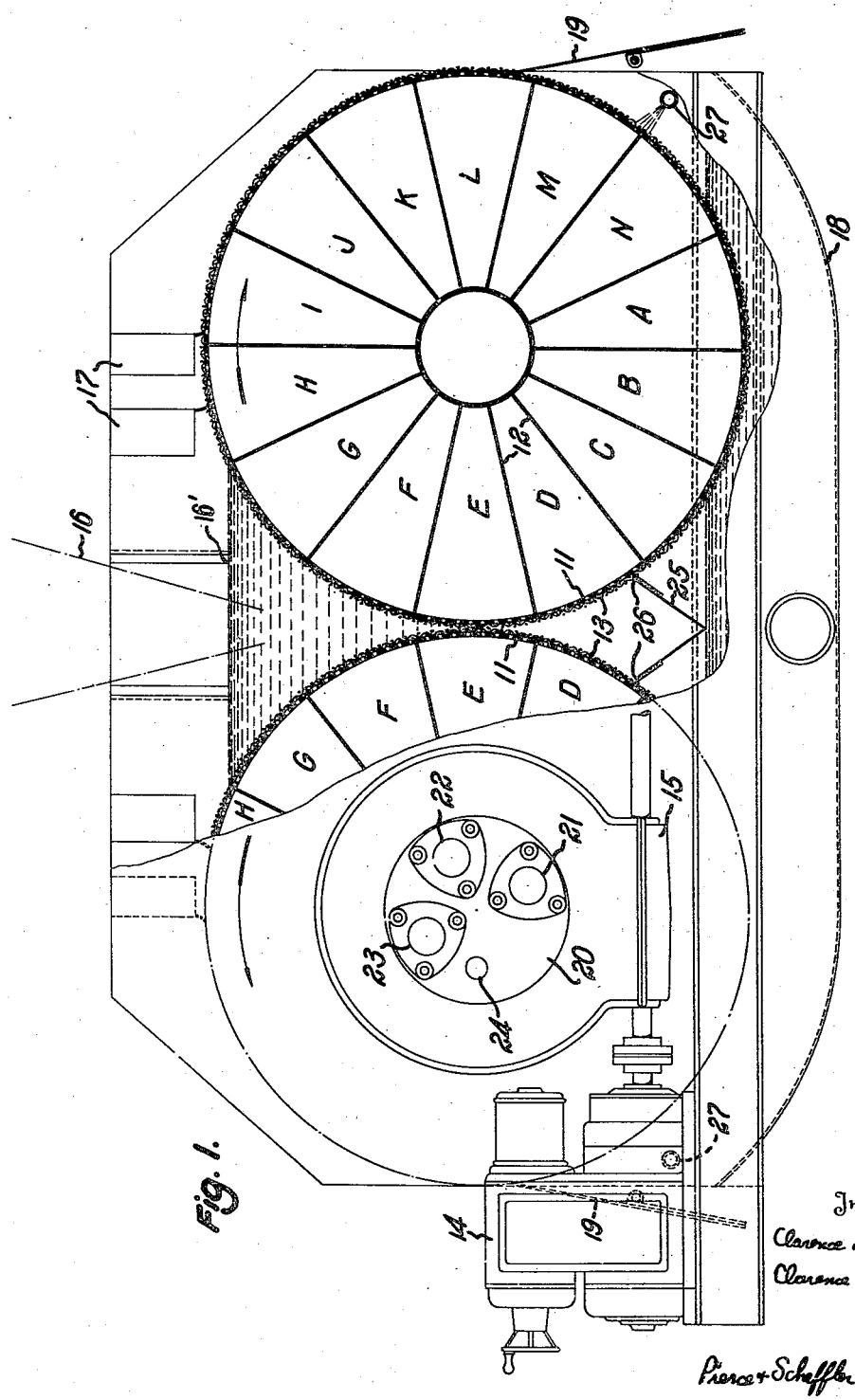
Fig. 1 is a side elevation in partial section of a filter apparatus embodying the principles of the invention.

The filtering apparatus shown in Fig. 1 includes a pair of drums comprising a filter medium supporting circumferential grid structure 11 and radial partitions 12 dividing the interior of the drums into a plurality of radial filter chambers. A suitable filter medium 13, such as canvas or other fabric, is carried on the circumferential filter surface of the drums. The drums are mounted for rotation about parallel horizontal axes and are rotated at synchronized variable speeds by means of variable speed motor drive unit 14 and worm and wheel drive 15.

The circumferential surfaces of the drums are in contact along a line parallel to their axes of rotation and a feed chamber is provided above the line of contact by means of check plates which engage the end surfaces of the drums. Feed box 16 is provided above the feed chamber, and wash boxes 17 are mounted above the drums. A constant level of material in the feed chamber is maintained by overflow weir 16'.

The drums are positioned with their lower surfaces immersed in feed tank 18. At a suitable position in the outside periphery of the drum, cake discharge scrapers 19 are provided.

At one end of each of the drums is rotary valve mechanism 20 having connections to sources of vacuum and air pressure and connecting with conduits passing to each of the radial filter chambers of the drums. By means of valve mechanism 20 it is possible to regulate the amount and direction of the pressure differential across the filter surface of the individual radial filter chambers at various positions. The valve mechanism shown in the drawings by way of example is provided with connections 21, 22 and 23 to a source of vacuum and connection 24 to a source of air pressure.

In operation, a slurry of a suitable filter aid material, such as diatomaceous earth in liquid suspension, is fed into feed tank 18, and the material to be filtered is fed into the feed chamber above the line of contact of the rotary drums and the agitation imparted by the rotation of the drums maintains the solids of the slurry mixture in suspension. With the drums rotating in the direction indicated by the arrows, vacuum is maintained on the filter chambers through the positions A to D through connection 21 to effect the formation of a thin coat of filter aid material on the filter medium 13, while the filtrate passes through said medium and is collected in a separate receiver (not shown). Vacuum is maintained on the filter chamber through the positions E to H by way of connection 22 to draw the material to be filtered through the filter medium forming a filter cake of the insoluble portions on the adhering precoat layer and collecting the filtrate and the first washings in a further receiver (not shown). Vacuum is further maintained through the positions I to K by way of connection 23 to drain the second washings into a third receiver (not shown). At position L air pressure is advantageously admitted to the filter chambers through connection 24 to assist in the removal of the filter cake and underlying filter aid material by scraper 19.

The amount of differential pressure applied across the filter surfaces in the various positions of the chambers will, of course, be varied to suit the properties and requirements of the material to be filtered.

Trough 25 serves to catch any of the material to be filtered which drips between the drums and also supports knife scrapers 26 which limit the thickness of the precoat. Spray pipe 27 serves to wash the filter medium after the cake has been removed.

In the embodiment of the invention shown in Fig. 2, in which like reference numerals denote like parts to those of Fig. 1, the drums rotate in the opposite sense from the drums of Fig. 1. The filter aid material is fed into the feed chamber above the line of contact of the rotary drums, and the material to be filtered is fed into the feed tank 18. With the drums rotating in the direction indicated by the arrows, air pressure is maintained on the filter chambers through positions A and B by way of connection 21, to keep the filter aid material agitated, and a vacuum is connected to the filter chambers at position C by way of connection 22 to effect the formation of a thin precoat of filter aid material. The vacuum may then be maintained through positions D to K to draw the material to be filtered through the filter medium forming a filter cake of the insoluble portion which is drained in passing through positions J and K. At position L air pressure is advantageously admitted through connection 23 to assist in the removal of the filter cake and underlying filter aid material on to apron 28 by scraper 29.

In Fig. 3, drum 11 is similar to the drums of Figs. 1 and 2. Associated with drum 11 is a smaller, solid-surfaced or resilient-surfaced drum 30, which cooperates with drum 11 and suitable end plates to form a feed chamber above the line of contact of the drums. The material to be filtered may be fed into this chamber and the slurry of filter aid material fed into the feed tank 18. The method of operation is then similar to that described with reference to Fig. 1. Scraper 31 is provided to keep the surface of drum 30 clean.

The invention will be seen to be susceptable of numerous variations and is not limited to the details of construction and operation shown and described for the purpose of illustration, but broadly comprises the method and apparatus as defined in the appended claims.

We claim:

1. A method of filtration which comprises rotating a pair of endless rotary filter surfaces into close approach to each other along a line parallel to the axes of rotation, continuously supplying a layer of filter aid material to said filter surfaces at the approach side of said line of close approach, continuously supplying material to be filtered to the precoated filter surfaces beyond said line of close approach while maintaining a differential pressure through said layer of filter aid material, and continuously removing the layer of filter aid material and deposited filter cake before the filter surfaces arrive at the zone of deposition of the filter aid material.

2. A method of filtration which comprises rotating a pair of endless rotary filter surfaces into close approach to each other along a line parallel to the axes of rotation, continuously supplying a layer of filter aid material to said filter surfaces below said line of close approach, continuously supplying material to be filtered to the precoated filter surfaces above said line of close approach while maintaining a differential pressure through said layer of filter aid material, and continuously removing the layer of filter aid material and deposited filter cake before the filter surfaces arrive at the zone of deposition of the filter aid material.

3. Filter apparatus comprising a rotatable filter drum including means for supporting a filtering medium about the circumferential surface thereof, a second rotatable drum in close approach to the circumferential surface of said filter drum along a line parallel to the axis of rotation thereof, means cooperating with the end surfaces of said drums to provide a liquid-containing chamber above the axis of rotation of the filter drum, and means providing a second liquid-containing chamber in which the circumferential surface of the drum below the axis of rotation thereof is immersed.

4. Filter apparatus comprising a pair of drums including means for supporting a filtering medium about the circumferential surfaces thereof mounted for rotation about parallel horizontal axes spaced so that the filter surfaces of said drums closely approach contact along a line parallel with the axes of rotation of the drums, means cooperating with the end surfaces of said drums to provide a feed chamber immediately above the line of close approach of said filter surfaces, and means for supplying material to be filtered to the filter surfaces below the line of close approach of said filter surfaces.

5. Filter apparatus comprising a pair of drums including means for supporting a filtering medium about the circumferential surfaces thereof mounted for rotation about parallel horizontal axes spaced so that the filter surfaces of said drums closely approach contact along a line parallel with the axes of rotation of the drums, means cooperating with the end surfaces of said drums to provide a feed chamber immediately above the line of close approach of said filter surfaces, means for supplying material to be filtered to the filter surfaces below the line of close approach of said filter surfaces, and means for synchronously rotating said drums toward the line of close approach from the tops of the drums.

6. Filter apparatus comprising a pair of drums including means for supporting a filtering medium about the circumferential surfaces thereof mounted for rotation about parallel horizontal axes spaced so that the filter surfaces of said drums closely approach contact along a line parallel with the axes of rotation of the drums, means cooperating with the end surfaces of said drums to provide a feed chamber immediately above the line of close approach of said filter surfaces, means for supplying material to be filtered to the filter surfaces below the line of contact of said filter surfaces, means for synchronously rotating said drums toward the line of close approach from the tops of the drums, and valve means connecting the interior of said drums with a source of vacuum.

7. Filter apparatus comprising a pair of drums including means for supporting a filtering medium about the circumferential surfaces thereof mounted for rotation about parallel horizontal axes spaced so that the filter surfaces of said drums closely approach contact along a line parallel with the axes of rotation of the drums, means cooperating with the end surfaces of said drums to provide a feed chamber immediately above the line of close approach of said filter surfaces, means for supplying material to be filtered to the filter surfaces below the line of contact of said filter surfaces, means for synchronously rotating said drums toward the line of close approach from the tops of the drums, means providing a plurality of filter chambers extending longitudinally beneath the circumferential filter surfaces of said drums, and valve means connecting said chambers to subatmospheric pressure at predetermined positions of said chambers and admitting air under pressure to said chambers at other predetermined positions of said chambers.

8. Filter apparatus comprising a liquid precoat supply tank, a pair of drums including means for supporting a filtering medium about the circumferential surfaces thereof mounted for rotation in said supply tank about parallel axes spaced so that the filter surfaces closely approach contact along a line parallel with the axes of rotation of the drums, and means cooperating with the end surfaces of said drums to provide a liquid-containing chamber immediately above the line of close approach of said filter surfaces.

9. A continuous filtration method, which comprises maintaining upper and lower bodies of fluent matter in contact with separated surface portions of an endless rotary filter medium moved along a circular path, the lower body including precoat material and the upper body consisting of material to be filtered; depositing a coating on the exposed surface of the medium in contact with the precoat material by exhausting liquid to atmosphere through reducing the pressure on the side of said filter medium opposite said precoat material; similarly exhausting liquid to atmosphere while the filter medium is in contact with the material to be filtered to draw off filtrate and deposit suspended matter on the coating; and then discharging all the deposited matter from the filter medium by a combined scraping and washing action at a position on said circular path substantially opposite said upper body, to expose the surface of said filter medium prior to movement thereof into contact with the precoat material.

10. Apparatus for continuous filtration comprising an endless filter medium; means for supporting said filter medium and moving said filter medium along a rotary path having upper and lower limits; means for maintaining a body of fluent matter contacting said filter medium on the ascending side of said path and between the upper limit and the center of rotation thereof, such body of fluent matter comprising material to be filtered; means for maintaining a second body of fluent matter contacting said filter medium at and adjacent the lower limit of movement thereof, said second body comprising finely divided precoat material in liquid suspension; means for exhausting liquid to atmosphere by reducing the pressure on the side of said filter medium opposite said bodies while said filter medium is in contact with said bodies for first depositing a layer of precoat material on said filter medium and afterward depositing, on said precoat layer, a layer of solids from said material to be filtered; scraping means for removing substantially all of both said layers at a position on the descending side of said path and below the center of rotation of said filter medium; and washing means below said scraping means for removing adhering solids from said filter medium.

11. Apparatus for continuous filtration as defined in claim 10, including scraping means above said second body of fluent matter, but below said first body of fluent matter, for removing deposited precoat material in excess of a predetermined thickness.

12. A continuous filtration method which comprises moving an endless filter medium along a rotary path having upper and lower limits; maintaining upper and lower bodies of fluent matter in contact with separated surface portions of said filter medium, said upper body of fluent matter comprising material to be filtered, including finely divided solids in liquid suspension, and said upper body contacting said filter medium on one side of said path and between the upper limit of said path and the center of rotation of said filter medium, said lower body of fluent matter comprising finely divided precoat material in liquid suspension, and contacting said filter medium along the lower portion of said path; exhausting liquid to atmosphere by reducing the pressure on the side of said filter medium opposite said bodies while said filter medium is in contact with said bodies for first depositing a layer of precoat material on said filter medium and afterwards depositing, upon said precoat layer, a layer of solids from said material to be filtered; and removing both layers at a position on the opposite side of said path from said upper body.

13. A continuous filtration method as defined in claim 12, wherein the removal of said layers of precoat material and solids from said material to be filtered, includes the steps of increasing the pressure on the side of said filter medium opposite said layers, and scraping said filter medium.

14. A continuous filtration method as defined in claim 12, wherein the removal of said layers of precoat material and solids from said material to be filtered, includes the steps of increasing the pressure on the side of said filter medium opposite said layers, scraping said layers from said filter medium, and then washing said filter medium by spraying jets of liquid thereagainst.

15. A continuous filtration method as defined in claim 12, including the removal of precoat material in excess of a predetermined thickness prior to contact of said filter medium with said material to be filtered.

16. A continuous filtration method which comprises moving a pair of endless filter mediums along rotary paths having substantially the same upper and lower limits, said filter mediums closely approaching contact along a line between said upper and lower limits; maintaining upper and lower bodies of fluent matter in contact with separated and corresponding surface portions of said filter mediums, said upper body of fluent matter contacting said filter mediums above said line of close approach, and said lower body of fluent matter contacting said filter mediums along the lower portion of the path of each filter medium, one body of fluent matter comprising finely divided precoat material in liquid suspension, and the other body comprising material to be filtered, including finely divided solids in liquid suspension; moving said filter mediums in opposite directions so as to cause said filter mediums to first contact said precoat material and later contact said material to be filtered; exhausting liquid to atmosphere by reducing the pressure on the side of each filter medium opposite said bodies while said filter mediums are in contact with said bodies, for first depositing a layer of precoat material on each filter medium and afterwards depositing, upon said precoat layer, a layer of solids from said material to be filtered; and removing substantially all of both layers from each filter medium before said filter mediums again contact the body of precoat material.

17. A continuous filtration method, as defined in claim 16, wherein the upper body comprises material to be filtered, and the lower body includes precoat material.

18. A continuous filtration method, as defined in claim 16, wherein the upper body includes precoat material, and the lower body comprises material to be filtered.

CLARENCE LYNN PETERSON.
CLARENCE J. PETERSON.